Aug. 13, 1968  D. C. STAFFORD  3,397,113
MODULAR SUPPRESSION TANKS FOR NUCLEAR CONTAINMENT STRUCTURES
Filed May 10, 1966  3 Sheets-Sheet 1

INVENTOR.
DONALD C. STAFFORD
BY Merriam, Marshall, Shapiro & Klose
ATTORNEYS

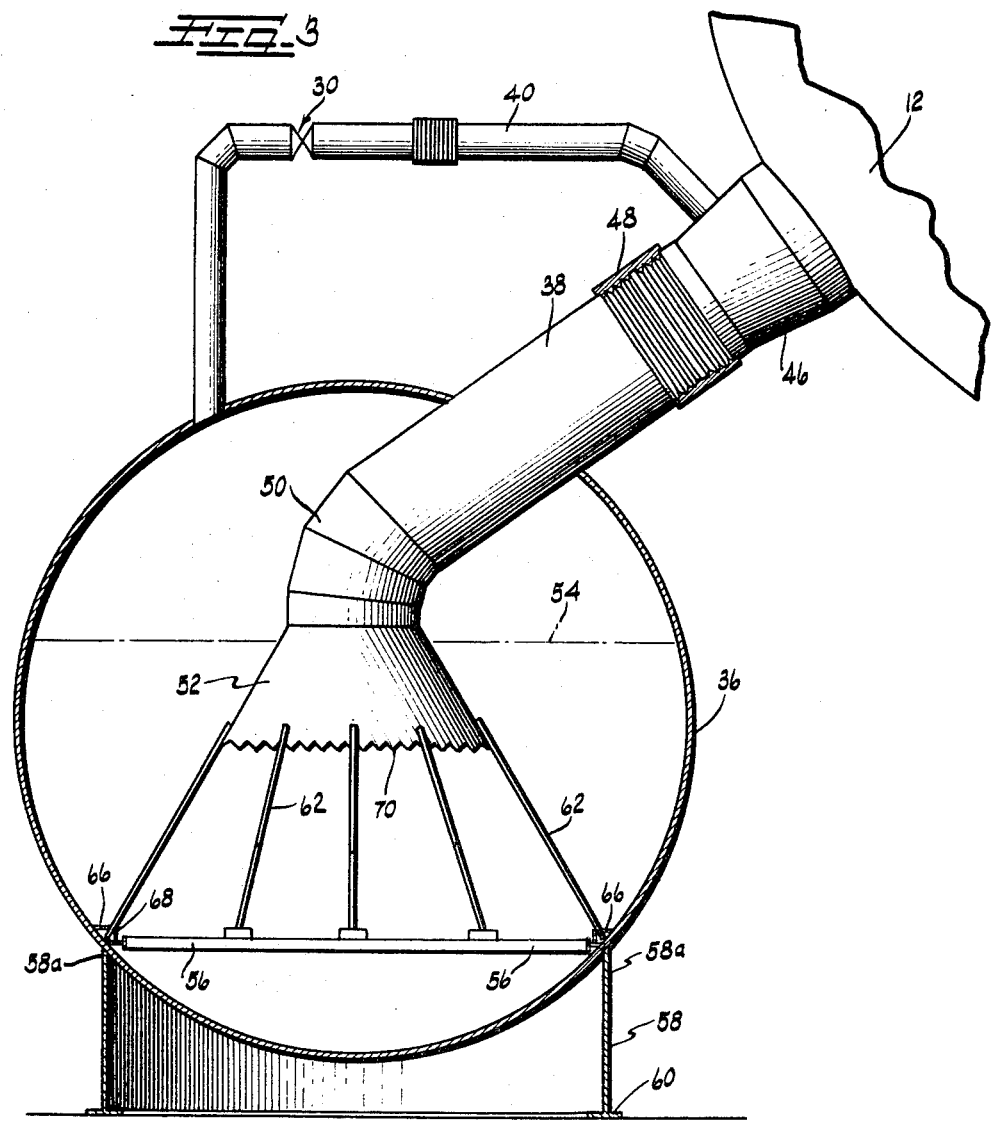
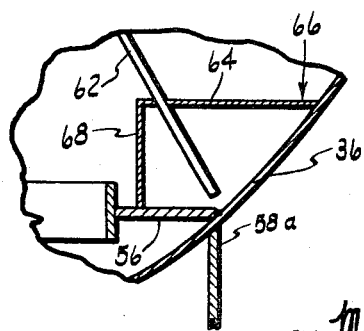

Aug. 13, 1968    D. C. STAFFORD    3,397,113
MODULAR SUPPRESSION TANKS FOR NUCLEAR CONTAINMENT STRUCTURES
Filed May 10, 1966    3 Sheets-Sheet 3

INVENTOR
DONALD C. STAFFORD
BY Morrison, Marshall, Shapiro & Klose
ATTORNEYS

United States Patent Office 3,397,113
Patented Aug. 13, 1968

3,397,113
MODULAR SUPPRESSION TANKS FOR NUCLEAR CONTAINMENT STRUCTURES
Donald C. Stafford, Hinsdale, Ill., assignor to Chicago Bridge & Iron Company, Oak Brook, Ill., a corporation of Illinois
Filed May 10, 1966, Ser. No. 549,059
4 Claims. (Cl. 176—37)

ABSTRACT OF THE DISCLOSURE

A nuclear reactor containment system in which a number of suppression tanks are spaced about and separated from the drywell vessel. A series of vent tubes interconnect the drywell vessel with each individual tank, the tube being supported in the tank by an inside girder and rod structure, with the girder also serving to stiffen the tank for emplacement on a supporting structure.

---

This invention relates to nuclear reactor containment structures and more particularly to improved suppression vessels for use in such structures.

In the generation of power by means of steam turbines, advanced power generation systems have utilized nuclear reactors to generate the steam necessary for driving the turbines. In such systems a controlled nuclear reaction is allowed to occur within a contained structure such that the resulting heat of reaction is used to convert a water supply into steam. In the event that too much steam pressure is generated, the excess must either be contained within the system or dissipated.

With large power generating systems, it is difficult to contain such excess pressures entirely, so they must also be dissipated. Prior art techniques have utilized a torus shaped suppression vessel about half full of water which is interconnected with the reactor system in order that the excess steam is condensed into water vapor in the suppression vessel. These one-piece torus or doughnut shaped vessels are very large tank structures—a representative tank having a 30′ cross section diameter and a 109′ center line diameter. The tank is placed within a hole or retaining well which surrounds a drywell vessel in the reactor system and is connected to the drywell vessel by means of a series of vent lines consisting of headers and downcomers. The large size of such one-piece tanks necessitates that the tank be constructed in sections which are then lowered into the retaining well and by welding or other suitable securing means, the sections are interconnected within the well.

Elaborate support structures are required for such prior art units since, as the torus tank is heated or cooled, it correspondingly expands and contracts as a single unit in all directions. This requires that the support structure for the tank be somewhat flexible to properly support the tank in the event of such movements. One commonly used support structure is a series of flexible pin columns; however, these are costly items and necessitate time consuming and expensive procedures in placement of the tank in position in the retaining well on the flexible columns.

According to the present invention there is provided a series of individual suppression tanks which are readily constructed and spaced around a reactor system, so that a relatively simple support structure for each tank can be utilized. Furthermore, the use of separate spherically shaped tanks in the suppression system enables the expansion and contraction to occur uniformly within an individual tank, rather than throughout a large torus structure as in the prior art.

The invention will be better understood from the following detailed description thereof taken in conjunction with the accompanying drawings in which:

FIGURE 3 is a sectional view taken along the section line III—III of FIGURE 2;

FIGURE 4 is an enlarged fragmentary view illustrating in detail the support means for the spherical tank.

Figure 1:
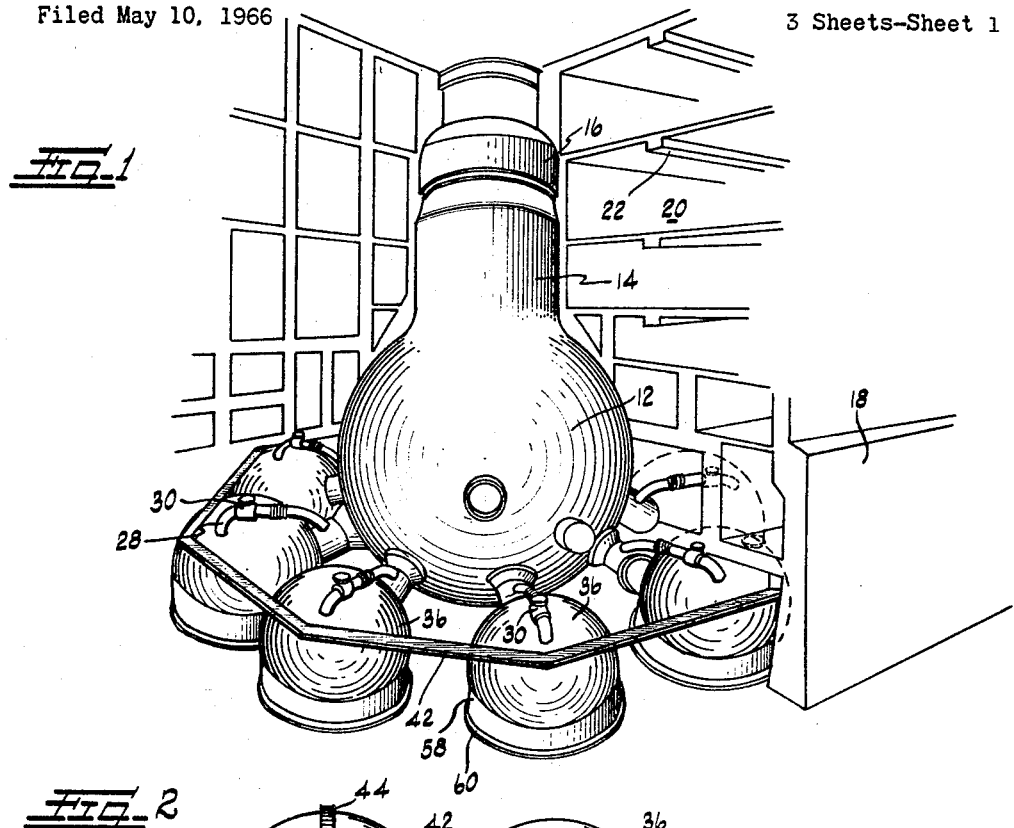
FIGURE 1 is a perspective view of a nuclear containment system with a series of individual spherically shaped suppression vessels illustrating one embodiment of the invention.
Figure 2:
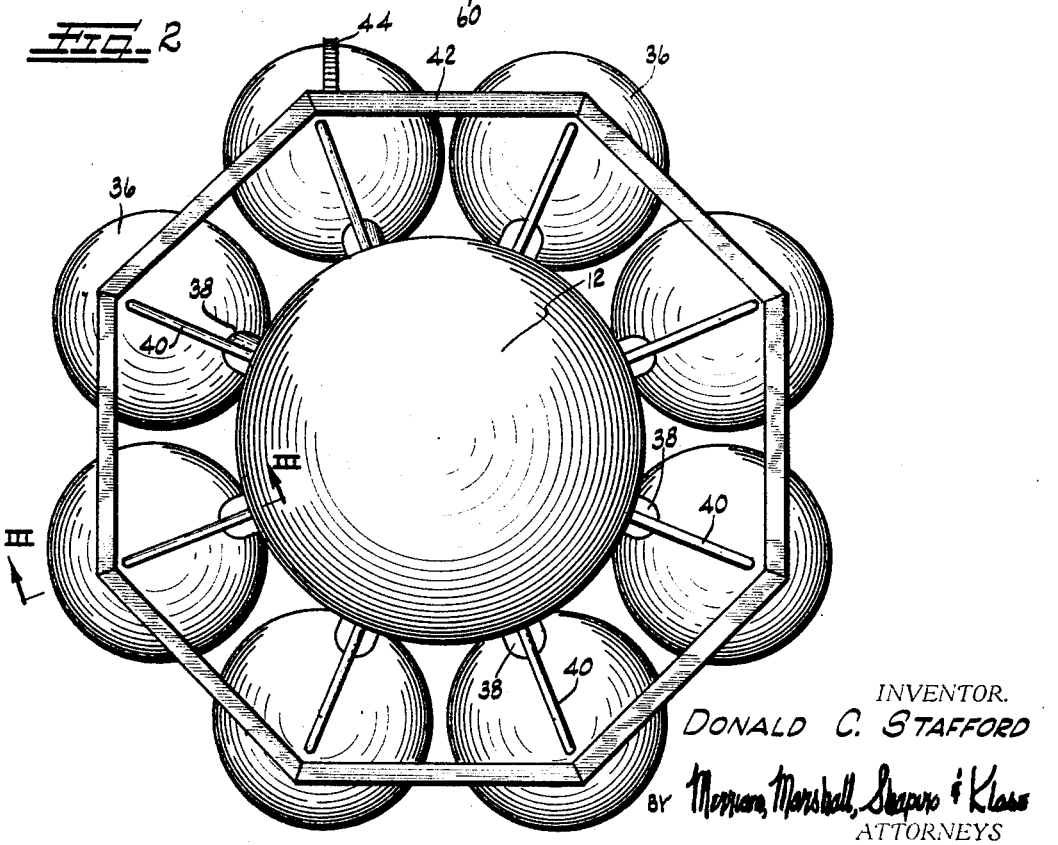
FIGURE 2 is a plan view of a portion of the nuclear containment system shown in FIGURE 1.

Referring to FIGURES 1 and 2, there is illustrated a nuclear reactor containment system within which one embodiment of the suppression vessel structure of this invention has been incorporated.

Such systems include a reactor containment drywell vessel 12, shown shaped in the form of a lightbulb, and including in the neck portion 14 a nuclear reactor to which is coupled a number of input water lines and output high pressure steam lines from the ball shaped bottom portion. In a well known manner a water supply is heated by the heat released during a controlled nuclear reaction to provide a source of high pressure steam for driving the steam turbines in the power generating system. A cap 16 at the top of the vessel 12 is removable to gain access to the inside portion of the vessel 12 for maintenance and periodic recharging of the nuclear reactor. Surrounding the containment system is a steel reinforced concrete structure 18 which contains a number of sections such as secton 20 which includes a crane movably mounted to a guide rail 22 for servicing the containment system, such as during the removal of the cap 16 from the vessel 12, etc.

In accordance with the present invention there is illustrated a number of spherical suppression tanks 36 spaced around the drywell vessel 12. The tanks 36 are individually connected by means of vent tubes 38 to the drywell vessel, and there is also provided a series of vacuum breaker lines 40 containing a suitable vacuum breaker valve 30 to provide equalization of pressure between the drywell vessel 12 and each of the tanks 36. A platform 42 is supported around the tanks 36 and is accessed by means of a ladder 44 for servicing or maintenance purposes in connection with the operation of the illustrated system.

Referring now to the sectional view of FIGURE 3 there is illustrated in greater detail the individual vent means and support means utilized with each of the suppression tanks constructed according to the principles of the present invention. Each of the vent tubes 38 is connected to a drywell vessel output tube 46 by means of a commonly used expansion coupling joint or bellows 48 at one end thereof, with the other end of tube 38 coupled to an elbow 50 and ending in a cone-shaped output end 52 within the corresponding tank 36. The spherically shaped suppression tanks 36 are each filled with a quantity of water to the level indicated at the reference character 54, and it may be noted that the cone-shaped output end 52 of tube 38 extends below the surface of the normal water level at 54. To support the spherical tank 36 an inside girder or base ring 56 is welded at a circular contacting edge to the inside surafce of the tank. A cylindrical skirt 58 having a base 60 has a diameter approximately equal to the diameter of the base ring 56, such that when the spherical tank 36 is placed on the support skirt 58, the tank 36 is supported substantially by means of the base ring 56 resting on the upper portion 58a of the skirt— as illustrated most clearly in the enlarged sectional view of FIGURE 4. The support skirt 58 can also be formed of a plurality of vertical columns arranged in a cylindrical manner around each of the tanks 36.

The tube 38 and associated conical termination section 52 are supported within the spherical tank 36 by means of a series of tie rods or bars 62. One end of each of the rods 62 is welded or secured by other well known means to the cone-shaped output end 52. The other end of each of the rods 62 pass through apertures in corresponding end brackets 64 and are welded thereto. Each of the end brackets has a flat upper surface which is welded to the tank 36 such as at location 66, and an upright surface 68 which is welded to the inside girder or base ring 56. Alternatively, this support structure can be a single plate clip at each of the rod positions rigidly securing the rods 62 to the girder 56.

In constructing the illustrated suppression apparatus, the cylindrical skirt 58 is first formed within the retaining well surrounding the drywell vessel. The tank itself can then either be completely or partially constructed outside of the hole and lifted and placed in position on the cylindrical support skirt. A typical spherical suppression tank has a diameter of approximately 35′, and since the outer tank surface can be constructed of relatively thin metal, the individual or modular tanks according to this invention are much lighter than the one-piece torus type suppression tank as used in the prior art. This enables smaller and more efficient lifting equipment to be utilized during construction. Similarly, it may be noted that the individual tank arrangement as shown herein enables a less expensive and complicated venting system—as opposed to the inner system of headers and downcomers utilized with the torus shaped suppression tanks as used heretofore. It must be realized of course that if desired the more conventional header and downcomer type of vent system could also be utilized with the individual tanks.

Referring now to FIGURE 3 it can be seen that the conical section 52 terminates in a zig-zag or scalloped end 70. This enables the individual suppression tanks of this invention to have somewhat the same venting characteristics as the header and downcomer configuration used with the prior art suppression vessels. As an alternate construction one or more rows of perforations at the end of the conical section 52 can be provided. In the event of an emergency, when a substantial amount of steam pressure is generated, the drywell vessel 12 is vented to the suppression tanks 36 so that the excess steam is condensed therein.

It is within the teachings of this invention to provide individual and spacially separated tanks having shapes other than the illustrated spherical configuration. Thus, the suppression tanks 36 could each be in the form of vertical or horizontal cylindrical tanks with hemispherical, elliptical or other forms of dish shaped ends. Such tanks can be readily constructed and placed in position according to the teachings of this invention. These and similar modular type suppression tank configurations provide a significant savings in cost, design, and in the amount of labor and support equipment required during construction as compared to the one-piece suppression tank configuration used heretofore.

Figure 5:
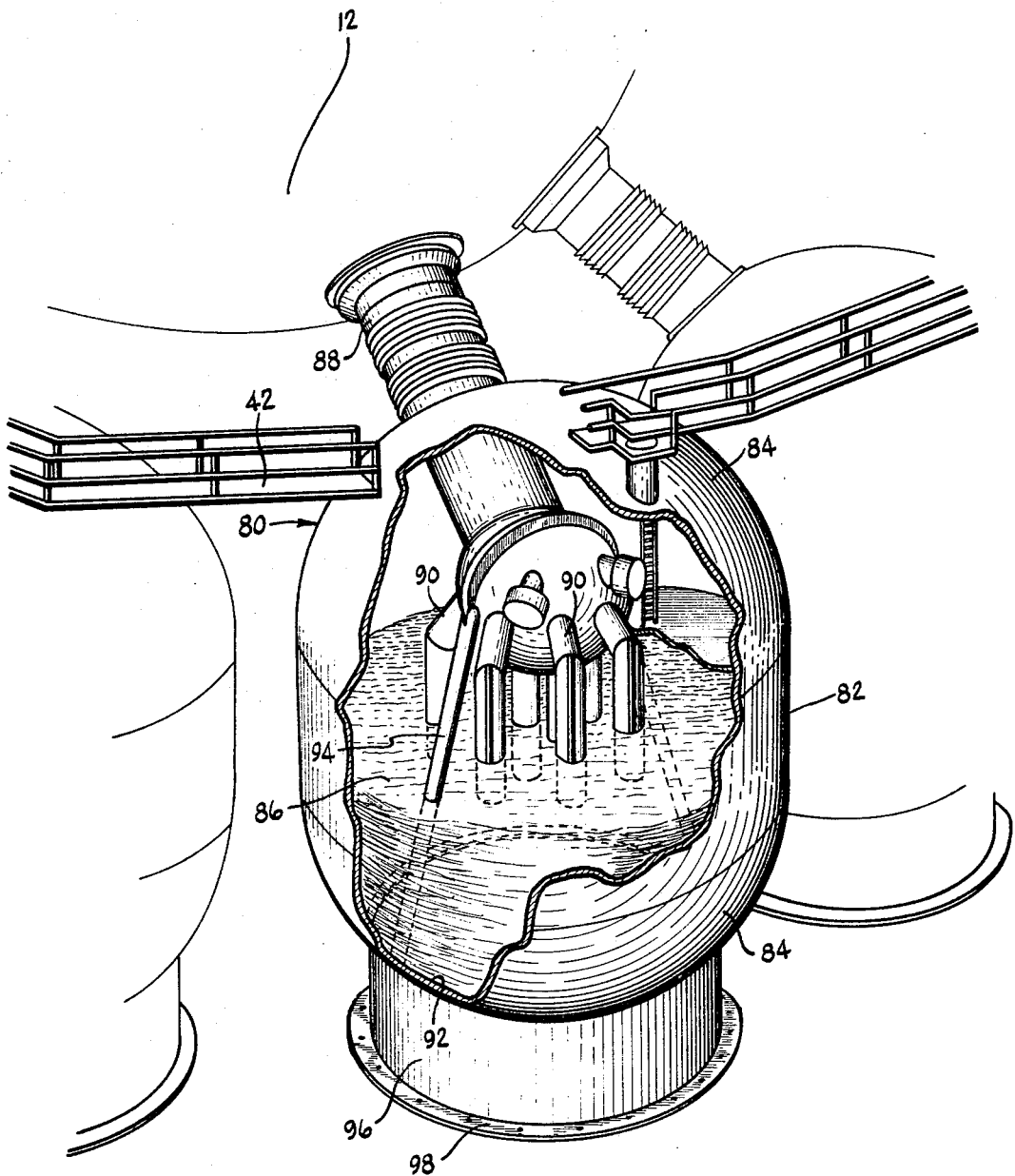
FIGURE 5 is a perspective view illustrating an alternative embodiment of the invention.

As an example of such an alternative embodiment, FIGURE 5 illustrates a series of tanks 80 each having a cylindrical middle portion 82 with dish shaped end portions such as hemispherical ends 84. Each of the tanks contains a quantity of water 86, and is vented to the drywell vessel 12 by a vent tube 88 having a series of downcomers 90 which protrude below the level of the liquid in each tank.

An inside girder or base ring 92 is welded at a circular contacting edge to the inside surface of the tank. The tube 88 is supported within the tank by means of a series of rods 94 having ends respectively mounted to the tube and the girder.

As in the previously described spherical tank configuration, a cylindrical skirt 96 having a base 98, has a diameter approximately equal to the diameter of the girder 92, so that the skirt 96 meets the tank 80 at a lower portion thereof which has been stiffened by the girder 92.

The foregoing detailed description has been given for clearness of understanding only, and no unnecessary limitations should be understood therefrom, as modifications will be obvious to those skilled in the art.

What is claimed is:

1. In a pressure suppression nuclear reactor containment system having a drywell vessel, a nuclear reactor within said vessel for generating heat, a water supply circulating through said drywell vessel and heated by the reactor into a high pressure steam supply, the improvement comprising:

a plurality of thin walled metal suppression tanks spaced about and spacially separated from said drywell vessel, each containing a quantity of liquid, said thin walls being noncontiguous with said drywell vessel;

a plurality of skirt members for supporting said tanks, each of said skirt members engaging a respective tank at a lower junction portion thereof;

a series of vent tubes each individually coupling a corresponding tank with the drywell vessel, said tubes protruding below the level of the liquid in said tanks; and tube support means within said tanks for supporting said vent tubes.

2. A system according to claim 1, further including a girder secured within the inner portion of each of said tanks, said girder stiffening said junction between said tank and said skirt member, and wherein said tube support means include rod members within each of said tanks, said rod members having one end rigidly mounted to said girder and a second end secured to said vent tube to maintain said vent tube below the level of the liquid in said tank.

3. A system according to claim 1, wherein each of said tanks is spherically shaped.

4. A system according to claim 1, wherein each of said tanks is cylindrically shaped with dish shaped ends.

References Cited

UNITED STATES PATENTS

| | | | |
|---|---|---|---|
| 2,387,818 | 10/1945 | Wethly | 261—123 |
| 3,115,450 | 12/1963 | Schanz | 176—38 |
| 3,253,996 | 5/1966 | Bond et al. | 176—37 |
| 3,287,226 | 11/1966 | Webb | 176—38 |

FOREIGN PATENTS

| | | |
|---|---|---|
| 165,308 | 3/1904 | Germany. |

OTHER REFERENCES

Euro Nuclear, vol. 3, No. 1, January 1966, pp. 37–40.

CARL D. QUARFORTH, *Primary Examiner.*

H. E. BEHREND, *Assistant Examiner.*